(12) United States Patent
Schröter

(10) Patent No.: US 12,331,166 B2
(45) Date of Patent: Jun. 17, 2025

(54) COMPOSITION CONTAINING A NOVOLAC

(71) Applicant: BAKELITE GMBH, Iserlohn-Letmathe (DE)

(72) Inventor: Stephan Schröter, Essen (DE)

(73) Assignee: BAKELITE GMBH (DE)

( * ) Notice: Subject to any disclaimer, the term of this patent is extended or adjusted under 35 U.S.C. 154(b) by 447 days.

(21) Appl. No.: 17/148,952

(22) Filed: Jan. 14, 2021

(65) Prior Publication Data

US 2021/0277167 A1 Sep. 9, 2021

(30) Foreign Application Priority Data

Jan. 15, 2020 (EP) ..................... 20152076

(51) Int. Cl.
| | |
|---|---|
| C08G 8/10 | (2006.01) |
| C08G 8/32 | (2006.01) |
| C08G 8/36 | (2006.01) |
| C08G 18/54 | (2006.01) |
| C08J 3/03 | (2006.01) |
| C08J 3/09 | (2006.01) |
| C08J 9/00 | (2006.01) |
| C08L 61/06 | (2006.01) |
| C08L 61/14 | (2006.01) |
| C08L 75/04 | (2006.01) |
| C09D 175/04 | (2006.01) |
| C09J 175/04 | (2006.01) |

(52) U.S. Cl.
CPC ................ C08G 8/10 (2013.01); C08G 8/32 (2013.01); C08G 8/36 (2013.01); C08J 3/03 (2013.01); C08J 3/095 (2013.01); C08L 75/04 (2013.01); *C08J 2361/10* (2013.01)

(58) Field of Classification Search
None
See application file for complete search history.

(56) References Cited

U.S. PATENT DOCUMENTS

| | | | | |
|---|---|---|---|---|
| 5,032,642 | A | * | 7/1991 | Lemon .................. C08K 5/101 523/147 |
| 5,795,933 | A | * | 8/1998 | Sharp ...................... C08K 5/10 524/596 |
| 2004/0082713 | A1 | * | 4/2004 | Tutin ..................... C08L 61/14 524/596 |

FOREIGN PATENT DOCUMENTS

| | | |
|---|---|---|
| CN | 1367187 A1 | 9/2002 |
| CN | 107148450 A1 | 9/2017 |
| EP | 0084681 A1 | 8/1983 |
| EP | 0388145 A1 | 9/1990 |
| GB | 1505412 | 3/1978 |
| JP | 2005075938 A * | 3/2005 |
| JP | 2006273899 A * | 10/2006 |

OTHER PUBLICATIONS

LibreTexts—4.2: Viscosity of Polymers, https://chem.libretexts.org/@go/page/190667 (2024) (Year: 2024).*

* cited by examiner

*Primary Examiner* — Ha S Nguyen
(74) *Attorney, Agent, or Firm* — Edmonds & Cmaidalka, P.C.

(57) ABSTRACT

The invention relates to a composition containing a novolak and water. In one embodiment, a composition is provided comprising novolak and water with the percentage of ortho linkages of the phenol rings of the novolak is greater than that of para linkages, the novolak having a phenolic compound and an aldehyde molar ratio of from 1:0.2 to 1:0.45 and the composition having from 2% to 20% by weight of water based on the weight of the sum of the novolak and the water.

19 Claims, No Drawings

COMPOSITION CONTAINING A NOVOLAC

RELATED APPLICATION DATA

This application claims benefit to European Patent Application No. 20152076.4, filed Jan. 15, 2020, of which the entire contents of the application are incorporated by reference herein.

DETAILED DESCRIPTION

The invention relates to a composition containing a novolak and water.

Novolaks are adequately known from the prior art. Thus, they are produced by a condensation reaction of phenolic compounds such as phenol, cresols, xylenols, bisphenols, resorcinol, catechol, hydroquinone and/or naphthols and the like, including mixtures thereof, with aldehydes such as formaldehyde or acetaldehyde in a ratio of from 1:0.2 to 1:0.91 using an acid catalyst. Depending on the reaction conditions and catalyst, novolaks having a different number of linked phenol rings and also comprising various isomer mixtures, which have an influence on the properties of the product, are formed.

Novolaks are generally solid products having a softening point of from 30° C. to 160° C. and a molar mass $M_n$ of from 220 to 1200 g/mol. Depending on their properties, novolaks are used for a variety of applications such as coatings, adhesives, abrasives, laminates, pourable resins, friction materials, pressing materials, refractory materials and wood composites.

However, if the novolak has to be used in the liquid state, restrictions are placed on the application because of the softening point of the novolak and the prevailing viscosity. Thus, processing of hot resin melts generally results in a complicated process in which, in particular, occupational hygiene requirements have to be taken into account, so that the use of novolak melts is ultimately restricted.

There have been efforts in the past to solve this problem by addition of novolak in the form of emulsions or dispersions. Thus, adding water to the novolak resin during or after the condensation reaction, with the novolak resin dispersion being formed by addition of an effective amount of protective colloids, is known from EP 0084681 B1 and U.S. Pat. No. 4,788,236.

Furthermore, DE-A-2804362 describes the production of phenolic resin dispersions by mixing solid phenolic resin, water, an organic coupling agent and polyvinyl alcohol.

U.S. Pat. No. 5,670,571 discloses the production of aqueous phenolic resin dispersions as binder for insulation based on glass fibres. This concerns the use of novolak dispersions in which protective colloids can be added to stabilize the novolak resin particles.

However, the addition of coupling agents and protective colloids is disadvantageous for many uses of aqueous novolak systems since they can interfere in further processing procedures. Thus, many additives having a surface-active effect result, for example, in poor wetting of substrates or prevent optimal foaming of the composition with addition of crosslinkers (e.g. diisocyanates, polyisocyanates, epoxy resins, phenolic resols) and blowing agents (e.g. pentane, isopentane).

It is therefore an object of the present invention to provide novolaks in a liquid preparation, which owing to their viscosity allow uncomplicated processing at temperatures of <100° C.

This object is achieved according to the invention by a composition containing a novolak and water, wherein
a) the percentage of ortho linkages of the phenol rings of the novolak is greater than that of the para linkages and
b) the novolak has been produced from a phenolic compound and an aldehyde in a molar ratio of from 1:0.2 to 1:0.45 and
c) the composition contains from 2 to 20% by weight of water based on the weight of the sum of novolak and water.

It has surprisingly been found that such a composition has a viscosity at temperatures of <100° C. of about 1000-5000 mPa*s (at 60° C.), which is suitable for many fields of application, with the addition of stabilizing substances such as protective colloids being able to be dispensed with. It was particularly unexpected that the composition is, depending on the temperature, virtually a homogeneous and, particularly surprisingly, storage-stable solution at temperatures in the range from 20° C. to 60° C., which solution essentially does not have a tendency to undergo crystallization or phase separation. The provision of the composition of the invention makes it possible for the range of uses of liquid novolak-containing aqueous systems to be significantly widened.

The novolak used for the composition of the invention has a percentage of ortho linkages of the phenol rings of the novolak which is higher than that of the para linkage. In general, these novolaks are referred to as "high-ortho novolaks" in which the ortho content is in the range from 50 to 100%. The determination of the ortho content by quantitative examination of the bisphenol F (BPF) isomers will be explained in more detail for the example of a phenolic novolak:

To determine the ortho content of a novolak, the content of the three bisphenol F isomers is determined by HPLC. The individual contents are normalized to 100%, so that the sum of all three isomers is 100%. The ortho content is then given by the normalized o,o'-BPF content plus half the normalized o,p-BFP content. The para content is correspondingly given by the normalized p,p'-BPF content plus half the normalized o,p-BPF content.

These ortho novolaks are obtained when, for example, the condensation reaction is carried out under weakly acidic conditions (pH from 3 to 7) in the presence of doubly charged metal cations. The proportion of ortho substitution increases when using metal hydroxides of the first and second main groups in the following order: K<Na<Li<Ba<Sr<Ca<Mg. This effect is more pronounced when using ions of the transition metals Fe, Cu, Cr, Ni, Co, Mn and Zn. The greater the tendency of the metal ion to form stable chelate complexes, the greater is the degree of ortho substitution. Boric acid, too, displays a strongly ortho-directing effect because of its ability to form complexes. Ca, Mg, Zn, Cd, Pb, Cu, Co, Ni salts of acetic acid are usually used as catalysts for producing ortho novolaks. These ortho-condensed novolaks display, inter alia, an increased reactivity towards hexamethylenetetramine.

Processes for producing ortho novolaks are known from the prior art. Thus, U.S. Pat. No. 4,097,463 describes a corresponding process for producing ortho-condensed novolaks.

Another variant for the provision of novolaks having a high ortho content is disclosed in DE 1 645 217, in which a process with specific pressure and temperature conditions is described.

The condensation reaction for producing the novolak used for the composition of the invention takes place between a phenolic compound and an aldehyde in a molar ratio of from 1:0.2 to 1:0.45. In general, the phenolic compound is selected from among phenol, cresol, xylenol, bisphenol, resorcinol, catechol, hydroquinone, naphthol and the like, including mixtures thereof. In general, aqueous formaldehyde, paraformaldehyde and/or trioxane is used as aldehyde.

The most widely used starting materials are phenol and aqueous formaldehyde. These starting materials are usually selected because of their good reactivity, their availability and their low costs.

As mentioned above, a novolak in the production of which a molar ratio of the phenolic compound to the aldehyde of from 1:0.2 to 1:0.45, preferably from 1:0.25 to 1:0.4, is used for producing the composition of the invention. The ratio indicated leads to a low molecular weight novolak ($M_n$ of 210-400 g/mol determined by GPC and vapour pressure osmometry) which is usually a sticky mass. If relatively high proportions of aldehyde are used, the viscosity of the resulting novolak becomes too high and the water compatibility is reduced, so that no largely homogeneous and storage-stable mixture is obtained, which, each taken for itself, is disadvantageous for further processing.

Furthermore, the composition of the invention contains from 2 to 20% by weight of water based on the weight of the sum of novolak and water. At relatively low proportions of water (<2% by weight), there is not a sufficient amount of liquid to bring the novolak into solution and achieve a reduced processing viscosity. At proportions of more than 20% by weight of water, the water separates out above the novolak at the desired processing temperatures. Particular preference is given to a proportion of water of from 2 to 15% by weight, at which a largely miscible and storage-stable composition is obtained, with from 2 to 9% by weight of water being preferred because this gives an optimal composition in respect of miscibility and storage stability.

When using the amount of water indicated, it is surprising that the addition of a protective colloid, (e.g. high molecular weight substances such as polysaccharides, proteins, polyacrylates), which is intended to prevent clumping together of solid particles in a liquid homogeneous phase, is not necessary. Particularly at relatively high proportions of water (>about 10% by weight), this was not to be expected and is attributable to the use of the specific novolak in the composition of the invention.

As further additives, the composition of the invention can contain further components; for example, ammonium borates, ammonium phosphates, ammonium sulfate, organophosphorus substances, zinc borate, aluminium hydroxide, magnesium hydroxide would be conceivable as flame retardants.

In particular, it is advantageous to add one or more solvents (e.g. 1-10% by weight based on all components of the composition of the invention) as further component to the composition of the invention, by which means the viscosity can be influenced over a wide range as a function of the temperature, which considerably widens the range of uses of the composition of the invention. At the same time, a positive influence of the solvent and the amount thereof on the storage stability of the composition has been observed. Particular preference is given to the solvent being selected from among, for example, triethyl phosphate; tris(chloropropyl)phosphate (TCPP); benzyl alcohol; dibasic esters of acids, e.g. diethyl adipate, dimethyl adipate, diethyl succinate or dimethyl succinate; ethylene glycol; diethylene glycol and further diols or glycol ethers and/or mixtures thereof. Particular preference is given to using diethylene glycol because both the viscosity of the composition of the invention even at low temperatures and also the storage stability over a relatively long period of time (4 months) were at the desired high level. The addition of the solvent can be made to the novolak, to the novolak/water mixture or else to the water.

The composition of the invention containing a novolak and water can be produced by a process containing the following steps:
a) production of a novolak in which the percentage of the ortho linkages of the phenol rings is greater than that of the para linkages by condensation of a phenolic compound and an aldehyde in a ratio of from 1:0.2 to 1:0.45,
b) mixing of the condensate produced under a) with from 2 to 20% by weight of water based on the weight of the sum of novolak and water at temperatures in the range from 80 to 100° C. to produce the composition.

In a typical process for producing a conventional o-novolak, the phenol and catalyst (e.g. zinc acetate) are intimately mixed in an amount of, for example, 0.15-1% based on phenolic component. The formaldehyde is added thereto in the indicated ratio to the phenol either a little at a time or continuously over a predetermined period of time at a temperature of from 70 to 110° C. The reaction generates heat, so that cooling is often necessary. As soon as the initial exothermic reaction has concluded, the mixture is heated in order to complete the reaction of the two components. The reaction mixture is partially dewatered hot and under reduced pressure and a further condensation is carried out at about 130° C. for 1-3 hours in order to isolate the o-novolak in the desired composition. The o-novolak produced in this way is a sticky solid at room temperature with a molar mass $M_n$ of from 210 to 400 g/mol.

The production of the composition of the invention is carried out by either the o-novolak being admixed with water at from 80 to 100° C., preferably 90° C., while stirring immediately after it has been produced, or by storing the o-novolak after it has been produced and melting it and adding the required amount of water (from 2 to 20% by weight based on the weight of the sum of novolak and water) dropwise while stirring when required in order to produce the composition of the invention.

The addition of further components, e.g. solvents or flame retardants, can be carried out to the novolak, to the novolak/water mixture or else to the water.

The composition of the invention can be used for many applications. Process engineering restrictions are overcome by the provision of an aqueous novolak composition which is storage-stable in a temperature range from 20 to 80° C., i.e. in the range in which there is essentially no tendency for crystallization or phase separation to occur, and has an appropriate viscosity.

For example, the composition of the invention can be used directly and without additional distillation to produce novolak polyols. These are produced by reacting the composition of the invention with, for example, alkylene oxides, e.g. ethylene oxide and/or propylene oxide and/or butylene oxide, and/or alkylene carbonates, e.g. ethylene carbonate and/or propylene carbonate and/or butylene carbonate and/or mixtures thereof. However, other alkoxylating agents are also conceivable. The use of the composition of the invention for producing novolak polyols has the advantage that the water present in the composition of the invention coreacts in the alkoxylation reaction to form polyether diols, by which means the viscosity of the novolak polyol produced is advantageously reduced.

The fields of application of these novolak polyols can be manifold. Polyurethane foam applications and phenolic resin foam applications may, in particular, be mentioned by way of example here.

Thus, the composition of the invention itself or else in further-processed form as novolak polyol can serve, for example, as polyol component together with diisocyanates or polyisocyanates for producing polymers based on polyurethanes or polyisocyanurate. The use of the composition of the invention gives polymers having increased flame resistance, increased dimensional stability, an improved foam formation profile and reduced evolution of heat.

Owing to the storage stability of the composition of the invention, it can be made available to production as required. At the same time, storage and transport temperatures and also process conditions in the range from 100 to 150° C., as have hitherto been customary for pure novolaks, can be dispensed with because melting of the novolak component is made unnecessary by use of a simply meterable and pumpable aqueous novolak composition at, for example, 60° C. Handling and reaction conditions are thus simplified, as a result of which problems in respect of occupational hazard and environmental protection can also be significantly reduced.

The polyurethane materials produced by means of the composition of the invention can be used in the form of, for example, prepolymers, foams (rigid, flexible), coatings, paints and varnishes, elastomers, adhesives, sealants and/or composite materials. Using the composition of the invention for producing polyurethane foams is particularly advantageous since the water present in the composition of the invention reacts with the isocyanate and liberates carbon dioxide as blowing agent, which enables the addition of further blowing agents to be dispensed with.

Owing to the abovementioned advantages, the composition of the invention can be used generally for producing coatings, paints and varnishes, adhesives, insulation materials, abrasives, shaped products, binders, laminates and/or refractory materials.

EXAMPLES

The invention will now be illustrated with the aid of a working example:

a) Production of the o-novolak (ratio of phenol:formaldehyde=1:0.36)
  1. 179.72 kg of phenol are introduced as solid into a reactor and melted at temperatures of 55-65° C.
  2. 0.27 kg of zinc acetate dihydrate is dissolved in 1.03 kg of water and subsequently added while stirring. The reaction mixture is heated to 100° C.-110° C.
  3. 45.9 kg of formalin 45% are then added over 1 hour at 100° C.-110° C., followed by an after-reaction under reflux for 3 hours.
  4. A distillation under atmospheric pressure up to 130° C. follows.
  5. A halt phase of 2 hours at 130° C. can subsequently be carried out.
  6. The phenol distillate is recovered in further distillation steps.
  7. To reduce the free phenol content (<0.1%) and water content (max. 0.1%), the product is subjected again to a distillation in the presence of steam and under reduced pressure at temperatures in the range from 170° C. to 180° C.

Materials data for the o-novolak:
  Cone-and-plate viscosity at 75° C.: 25 600 mPa*s
  Cone-and-plate viscosity at 100° C.: 1040 mPa*s
  Water content determined by the Karl-Fischer method: 0.13%
  Molar mass ($M_n$) by means of GPC: 298 g/mol
  Molar mass ($M_w$) by means of GPC: 432 g/mol b) Production of the composition according to the invention (o-novolak/water mixture containing 5.3% by weight of water)
  7. At 90° C., 5.3 kg of water are added to 94.7 kg of the o-novolak produced under a) over a period of 1 hour.
  8. The product is cooled to 60° C. and drained through a filter.

Materials data for the o-novolak/water mixture:
  Cone-and-plate viscosity at 50° C.: 20 160 mPa*s
  Cone-and-plate viscosity at 60° C.: 4960 mPa*s
  Cone-and-plate viscosity at 75° C.: 920 mPa*s
  Water content determined by the Karl-Fischer method: 5.47%
  Molar mass ($M_n$) by means of GPC: 298 g/mol
  Molar mass ($M_w$) by means of GPC: 432 g/mol In Tables 1 and 2, the influence of different amounts of water on the properties of the composition of the invention were examined; in Table 1 the o-novolak was produced according to method a) (ratio of phenol:formaldehyde=1:0.36) and in Table 2 the ratio of phenol:formaldehyde was 1:0.3. The o-novolak/water mixtures were provided according to method b) using the amounts of water indicated in Tables 1 and 2.

The viscosities were measured by the cone-and-plate method (ISO 2884-1).

The molar mass was determined by means of gel permeation chromatography (GPC—commercial, separation column set: 6 columns in series, column packing: crosslinked polystyrene, eluent: THF, detector: UV 280 nm, calibration substance: phenol novolak).

TABLE 1

|  | o-Novolak (1:0.36) + 5.3% by weight of water (I) | o-Novolak (1:0.36) + 7% by weight of water (II) | o-Novolak (1:0.36) + 10% by weight of water (III) |
|---|---|---|---|
| Viscosity at 50° C. [mPa * s] | 20 160 | 7200 | 2960 |
| Viscosity at 60° C. [mPa * s] | 4960 | 2000 | 1100 |
| Viscosity at 75° C. [mPa * s] | 920 | 570 | 320 |
| Viscosity at 100° C. [mPa * s] | 170 | 230 | 50 |
| Water content [%] | 5.47 | 7.07 | 10.08 |
| Phenol content [%] | 0.21 | 0.19 | 0.07 |
| pH in acetone/water | 5.87 | 6.14 | 6.16 |
| Molar mass $M_n$ [g/mol] (GPC) | 298 | 307 | X |
| Molar mass $M_w$ [g/mol] (GPC) | 432 | 442 | X |

TABLE 2

|  | o-Novolak (1:0.3) + 3.5% by weight of water (IV) | o-Novolak (1:0.3) + 7% by weight of water (V) | o-Novolak (1:0.3) + 10% by weight of water (VI) |
|---|---|---|---|
| Viscosity at 50° C. [mPa * s] | 19 200 | 3200 | 1160 |

TABLE 2-continued

|  | o-Novolak (1:0.3) + 3.5% by weight of water (IV) | o-Novolak (1:0.3) + 7% by weight of water (V) | o-Novolak (1:0.3) + 10% by weight of water (VI) |
|---|---|---|---|
| Viscosity at 60° C. [mPa * s] | 4720 | 1320 | 400 |
| Viscosity at 75° C. [mPa * s] | 920 | 320 | 170 |
| Viscosity at 100° C. [mPa * s] | 160 | 80 | 45 |
| Water content [%] | 3.48 | 6.41/6.55 | 10.19/10.25 |
| Phenol content [%] | 0.01 | 0.03 | 0.03 |
| pH in acetone/water | 6.52 | 6.28 | 6.34 |
| Molar mass $M_n$ [g/mol] (GPC) | 267 | 274 | 267 |
| Molar mass $M_w$ [g/mol] (GPC) | 354 | 364 | 356 |

When, for example, the viscosities at 60° C. of the inventive compositions (I) to (VI) in Tables 1 and 2 are compared with the pure o-novolak produced in a), it can be seen that even a few percent by weight of water decrease the viscosity of the compositions of the invention to a great extent.

In addition, it was found that at 20° C. all compositions (I) to (VI) are stable in respect of their crystallization behaviour for at least 6 months. Likewise, separation of water occurred to only a slight extent, which did not impair the usability and handling of the compositions.

In Table 3, the o-novolak was produced as indicated under a) and admixed with 10% by weight of water and the indicated amount (% by weight) of the appropriate solvent based on the weight of the sum of novolak, water and solvent (all components).

TABLE 3

Mixture of o-novolak/water (10% by weight)/solvent mixture

|  | Solvent | Concentration of solvent [% by weight] | Viscosity at 60° C. [mPa * s] | Viscosity at 35° C. [mPa * s] | Viscosity at 25° C. [mPa * s] | Storage stability for 4 months at 20° C. | Storage stability for 4 months at 60° C. |
|---|---|---|---|---|---|---|---|
| VII | Triethyl phosphate | 10 | 560 |  |  | +/− |  |
| VIII | Triethyl phosphate | 5 | 640 |  |  | − |  |
| IX | DBE - dibasic ester | 10 | 390 | 13 120 |  | −− |  |
| X | DBE - dibasic ester | 5 | 580 | 16 980 |  | − | −− |
| XI | Benzyl alcohol | 10 | 290 | 3920 |  | − | −− |
| XII | Benzyl alcohol | 5 | 490 | 10 720 | 58 880 | − | − |
| XIII | Diethylene glycol | 10 | 390 | 4400 | 16 000 | ++ | ++ |
| XIV | Diethylene glycol | 5 | 540 | 9920 | 51 200 | + | ++ |

Unsatisfactory storage stability: − (minus)
Good, satisfactory storage stability: + (plus)

It can be seen from Table 3 that the viscosity of the inventive compositions admixed with appropriate solvents (VII-XIV) is at the desired level, but at the same time depending on the type and concentration of the solvent and the storage temperature, may also have surprisingly attractive storage stability. Diethylene glycol appears to be the best solvent here, as shown in Table 3. Owing to the consistency of the samples, quantitative analysis of separated fractions was not possible, so that determination of the degree of crystallization (measure of storage stability) was carried out by visual comparison of the samples with one another.

What is claimed is:

1. A homogenous novolak composition comprising:
   a novolak and
   3.48 wt % to about 10 wt % water based on the total weight of the novolac and water, wherein:
      a percentage of ortho linkages of phenol rings of the novolak is greater than that of para linkages of the phenol rings of the novolak,
      the novolak has a phenolic compound to aldehyde molar ratio of from 1:0.25 to 1:0.4; and
      the composition has a viscosity of from 1,000 mPa*s to 5,000 mPa*s at 60° C., as determined by ISO 2884 1, and wherein the composition is a homogeneous liquid phase solution at a temperature of from 20° C. to 80° C.

2. The composition according to claim 1, wherein the composition contains about 10 wt % of water based on the total weight of the novolak and the water.

3. The composition according to claim 1, wherein the composition contains from 7 wt % to about 10 wt % of water based on the total weight of the novolak and the water.

4. The composition according to claim 2, wherein the molar ratio of the phenolic compound to the aldehyde is from 1:0.3 to 1:0.4.

5. The composition according to claim 1, comprising one or more solvents.

6. The composition according to claim 5, wherein the solvent is selected from the group consisting of triethyl phosphate, tris(chloropropyl)phosphate, benzyl alcohol, dibasic esters, diethylene glycol and ethylene glycol and combinations thereof.

7. The composition according to claim 6, wherein the solvent is diethylene glycol.

8. The composition according to claim 7, wherein the solvent is present in a concentration of from 1 to 10% by weight based on all components of the composition.

9. The composition according to claim 1, wherein the composition does not contain a protective colloid.

10. A process for producing a composition comprising a novolak and water, comprising:
   a) producing a novolak comprising a percentage of the ortho linkages of the phenol rings is greater than that of the para linkages by condensation of a phenolic compound and an aldehyde in a ratio of from 1:0.25 to 1:0.4,
   b) mixing of the condensate produced under a) with from 3.48 wt % to about 10 wt % of water based on the total weight of the novolak and the water at temperatures in the range from 80 to 100° C. to produce a composition comprising the novolak and water, wherein the composition has a viscosity of from 1,000 mPa*s to 5,000 mPa*s at 60° C., as determined by ISO 2884 1, and the composition is a homogeneous liquid phase solution at a temperature of from 20° C. to 80° C.

11. A novolak polyol comprising the composition of claim 1.

12. The process according to claim 10, further comprising reacting the composition with one or more alkylene oxides, alkylene carbonates, or combinations thereof.

13. The composition according to claim 5, wherein the solvent is selected from the group consisting of diols, glycols ethers and combinations thereof.

14. The process according to claim 12, wherein the one or more alkylene oxides are selected from the group consisting of ethylene oxide, propylene oxide, butylene oxide, and combinations thereof, and wherein the alkylene carbonates are selected from the group consisting of ethylene carbonate, propylene carbonate, butylene carbonates, and combinations thereof.

15. A homogenous novolak composition comprising:
a novolak having a molar ratio of phenolic compound to aldehyde of from 1:0.25 to 1:0.4, wherein a percentage of ortho linkages of the phenol rings is greater than that of para linkages;
1 to 10% by weight of a solvent selected from the group consisting of triethyl phosphate, tris(chloropropyl) phosphate, benzyl alcohol, dibasic esters, diethylene glycol and ethylene glycol and combinations thereof, based on total weight of the composition; and
3.48 wt % to about 10 wt % water based on the total weight of the novolac and water,
wherein the composition does not contain a protective colloid, and
wherein the composition has a viscosity of from 1,000 mPa*s to 5,000 mPa*s at 60° C., as determined by ISO 2884 1, and the composition is a homogeneous liquid phase solution at a temperature of from 20° C. to 80° C.

16. The composition according to claim 15, wherein the solvent is diethylene glycol.

17. The composition according to claim 1, wherein the composition is a homogeneous liquid phase solution at a temperature of from 20° C. to 60° C.

18. The composition according to claim 15, wherein the composition is a homogeneous liquid phase solution at a temperature of from 20° C. to 60° C.

19. The composition according to claim 1, wherein the composition has a number average molecular weight (Mn) of 210-400 g/mol.

* * * * *